United States Patent
Emmanuel et al.

(10) Patent No.: US 11,863,761 B2
(45) Date of Patent: Jan. 2, 2024

(54) SECURITY SYSTEMS IMPLEMENTING COMMUNICATION WITH REMOTE USER DEVICES

(71) Applicant: Arlo Technologies, Inc., Carlsbad, CA (US)

(72) Inventors: Joseph Amalan Arul Emmanuel, Cupertino, CA (US); Peiman Amini, Mountain View, CA (US)

(73) Assignee: ARLO TECHNOLOGIES, INC., Carlsbad, CA (US)

( * ) Notice: Subject to any disclaimer, the term of this patent is extended or adjusted under 35 U.S.C. 154(b) by 0 days.

(21) Appl. No.: 17/583,629

(22) Filed: Jan. 25, 2022

(65) Prior Publication Data
US 2022/0150037 A1 May 12, 2022

Related U.S. Application Data

(63) Continuation of application No. 17/316,120, filed on May 10, 2021, now Pat. No. 11,290,727, which is a
(Continued)

(51) Int. Cl.
*H04N 19/166* (2014.01)
*H04N 19/103* (2014.01)
(Continued)

(52) U.S. Cl.
CPC ........... *H04N 19/166* (2014.11); *G06F 9/542* (2013.01); *G06T 7/20* (2013.01); *G06V 20/52* (2022.01);
(Continued)

(58) Field of Classification Search
CPC ............. H04N 19/166; H04N 5/23206; H04N 5/23227; H04N 5/23254; H04N 5/247;
(Continued)

(56) References Cited

U.S. PATENT DOCUMENTS 8,086,252 B2  12/2011  Luers
11,006,128 B2  5/2021  Emmanuel et al.
(Continued)

FOREIGN PATENT DOCUMENTS

CN  1618208 A  5/2005
CN  101070763 A  11/2007
(Continued)

OTHER PUBLICATIONS

Qi, LV, "Research on Measuring and Control Technology for the Intellectualization and Energy Saving in Green Home", China Master's Theses Full-text Database; I1136-482, 137 pages.
(Continued)

*Primary Examiner* — Usman A Khan
(74) *Attorney, Agent, or Firm* — Perkins Coie LLP (57) ABSTRACT

Adjusting communication channels used by camera to communicate with a base station are described. In one aspect, characteristics of communication channels can be determined and the operation of the camera can be adjusted to use a communication channel based on a comparison of the characteristics of multiple communication channels.

20 Claims, 5 Drawing Sheets

Related U.S. Application Data continuation of application No. 16/032,235, filed on Jul. 11, 2018, now Pat. No. 11,006,128.

(60) Provisional application No. 62/633,017, filed on Feb. 20, 2018.

(51) Int. Cl.

| | |
|---|---|
| *H04N 19/124* | (2014.01) |
| *H04N 19/156* | (2014.01) |
| *H04N 19/184* | (2014.01) |
| *H04N 19/40* | (2014.01) |
| *H04N 19/42* | (2014.01) |
| *H04B 17/318* | (2015.01) |
| *H04B 17/391* | (2015.01) |
| *H05B 47/19* | (2020.01) |
| *G07C 9/37* | (2020.01) |
| *H05B 47/105* | (2020.01) |
| *G06F 9/54* | (2006.01) |
| *G06T 7/20* | (2017.01) |
| *G08B 3/10* | (2006.01) |
| *G08B 5/22* | (2006.01) |
| *G08B 13/191* | (2006.01) |
| *G08B 13/193* | (2006.01) |
| *G08B 13/196* | (2006.01) |
| *G08B 21/18* | (2006.01) |
| *G08B 27/00* | (2006.01) |
| *G08B 29/18* | (2006.01) |
| *H04L 1/00* | (2006.01) |
| *H04L 5/00* | (2006.01) |
| *H04L 43/0852* | (2022.01) |
| *H04L 43/12* | (2022.01) |
| *H04L 43/16* | (2022.01) |
| *H04L 65/80* | (2022.01) |
| *H04L 67/1087* | (2022.01) |
| *H04N 7/12* | (2006.01) |
| *H04N 7/18* | (2006.01) |
| *H04N 17/00* | (2006.01) |
| *H04W 24/08* | (2009.01) |
| *H04W 24/10* | (2009.01) |
| *H04W 28/02* | (2009.01) |
| *H04W 36/00* | (2009.01) |
| *H04W 36/30* | (2009.01) |
| *H04W 52/02* | (2009.01) |
| *H04W 72/0453* | (2023.01) |
| *G06V 20/52* | (2022.01) |
| *H04L 65/65* | (2022.01) |
| *H04L 65/612* | (2022.01) |
| *H04W 4/38* | (2018.01) |
| *H04W 72/23* | (2023.01) |
| *H04N 23/90* | (2023.01) |
| *H04N 23/661* | (2023.01) |
| *H04N 23/60* | (2023.01) |
| *H04N 23/68* | (2023.01) |
| *H04N 7/14* | (2006.01) |
| *H04N 19/00* | (2014.01) |

(52) U.S. Cl.
CPC ............... *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/1966* (2013.01); *G08B 13/19656* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 5/0098* (2013.01); *H04L 43/0858* (2013.01); *H04L 43/12* (2013.01); *H04L 43/16* (2013.01); *H04L 65/612* (2022.05); *H04L 65/65* (2022.05); *H04L 65/80* (2013.01); *H04L 67/1093* (2013.01); *H04N 7/12* (2013.01); *H04N 7/183* (2013.01); *H04N 7/185* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04N 23/661* (2023.01); *H04N 23/665* (2023.01); *H04N 23/6811* (2023.01); *H04N 23/90* (2023.01); *H04W 4/38* (2018.02); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/0453* (2013.01); *H04W 72/23* (2023.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(58) Field of Classification Search
CPC .......... H04N 7/12; H04N 7/183; H04N 7/185; H04N 17/002; H04N 19/103; H04N 19/124; H04N 19/156; H04N 19/184; H04N 19/40; H04N 19/42; H04N 7/147; H04N 7/181; H04N 19/00; H04N 19/164; H04N 21/42202; H04N 21/2385; H04N 21/43615; H04N 21/44227; H04N 19/115; H04N 21/4223; H04N 21/43637; H04N 21/4402; H04N 21/6543; H04N 7/18; H04N 23/661; H04N 23/665; H04N 23/6811; H04N 23/90; G06F 9/542; G06T 7/20; G06T 2207/30232; G06T 2207/30241; G06V 20/52; G07C 9/37; G08B 3/10; G08B 3/1016; G08B 5/223; G08B 13/191; G08B 13/193; G08B 13/19656; G08B 13/1966; G08B 13/19669; G08B 13/19695; G08B 21/182; G08B 27/006; G08B 29/183; G08B 13/19645; G08B 25/08; G08B 13/196; H04B 17/318; H04B 17/391; H04B 17/373; H04L 1/0003; H04L 1/0009; H04L 1/0017; H04L 1/0033; H04L 5/0053; H04L 5/0098; H04L 43/0858; H04L 43/12; H04L 43/16; H04L 65/612; H04L 65/65; H04L 65/80; H04L 67/1093; H04L 1/0014; H04L 47/38; H04L 69/14; H04L 45/306; H04L 65/61; H04L 41/16; H04L 43/0817; H04L 43/0888; H04L 41/04; H04W 4/38; H04W 24/08; H04W 24/10; H04W 28/021; H04W 36/0011; H04W 36/30; H04W 52/0245; H04W 52/0261; H04W 72/042; H04W 72/0453; H04W 36/06; H04W 72/085; H04W 28/22; H04W 84/12; H04W 24/02; H04W 84/18; H04W 88/18; H04W 4/02; H04W 48/20; H04W 72/23; H04W 72/542; H05B 47/105; H05B 47/19; Y02D 30/70

USPC .......................................................... 348/267
See application file for complete search history.

(56) References Cited

U.S. PATENT DOCUMENTS

| | | | |
|---|---|---|---|
| 11,290,727 | B2 | 3/2022 | Emmanuel et al. |
| 2002/0049728 | A1* | 4/2002 | Kaku ....................... H04N 5/77 |
| 2005/0021724 | A1 | 1/2005 | Kung et al. |
| 2006/0094369 | A1 | 5/2006 | Nguyen |
| 2006/0179463 | A1 | 8/2006 | Chisholm et al. |
| 2007/0280237 | A1* | 12/2007 | Shin ....................... H04W 72/20 |
| | | | 370/390 |
| 2007/0280361 | A1* | 12/2007 | Kwon ................... H04W 76/10 |
| | | | 375/259 |
| 2008/0019347 | A1* | 1/2008 | Shin ....................... H04W 48/08 |
| | | | 370/345 |
| 2009/0143078 | A1 | 6/2009 | Tu et al. |
| 2010/0081447 | A1 | 4/2010 | Qi et al. |
| 2010/0214943 | A1 | 8/2010 | Immendorf et al. |
| 2011/0128389 | A1 | 6/2011 | Maeda et al. |
| 2011/0149087 | A1* | 6/2011 | Jeong ................... H04N 19/115 |
| | | | 375/E7.126 |
| 2011/0222449 | A1 | 9/2011 | Goldberg et al. |
| 2012/0185429 | A1 | 7/2012 | Shu et al. |
| 2012/0287879 | A1 | 11/2012 | Nentwig |
| 2013/0107816 | A1 | 5/2013 | Iraji et al. |
| 2013/0120597 | A1 | 5/2013 | Sakai et al. |
| 2013/0202274 | A1* | 8/2013 | Chan ....................... H04N 7/185 |
| | | | 386/362 |
| 2013/0322329 | A1 | 12/2013 | Visuri et al. |
| 2013/0331097 | A1 | 12/2013 | Kang et al. |
| 2014/0044113 | A1 | 2/2014 | Chu |
| 2015/0029333 | A1 | 1/2015 | Ko et al. |
| 2015/0154786 | A1 | 6/2015 | Furukawa et al. |
| 2015/0172958 | A1 | 6/2015 | Allanki et al. |
| 2015/0195187 | A1 | 7/2015 | Savolainen |
| 2015/0195324 | A1 | 7/2015 | Kim |
| 2015/0205749 | A1 | 7/2015 | Whitby-Strevens et al. |
| 2015/0333965 | A1 | 11/2015 | Lee et al. |
| 2016/0014679 | A1 | 1/2016 | Taneja |
| 2016/0050396 | A1 | 2/2016 | Gali et al. |
| 2016/0050587 | A1 | 2/2016 | Lam et al. |
| 2016/0105644 | A1 | 4/2016 | Smith et al. |
| 2016/0105847 | A1 | 4/2016 | Smith et al. |
| 2016/0134932 | A1 | 5/2016 | Karp et al. |
| 2016/0286500 | A1 | 9/2016 | Zur et al. |
| 2016/0295172 | A1 | 10/2016 | Cuddeback et al. |
| 2017/0142728 | A1 | 5/2017 | Tsai et al. |
| 2017/0163513 | A1 | 6/2017 | Kim et al. |
| 2017/0163944 | A1 | 6/2017 | Jeong |
| 2017/0178475 | A1 | 6/2017 | Renkis |
| 2017/0251173 | A1* | 8/2017 | Siminoff ................ G06V 10/95 |
| 2017/0257261 | A1 | 9/2017 | Monnerat |
| 2017/0278368 | A1 | 9/2017 | Burke |
| 2017/0303138 | A1 | 10/2017 | Barmettler et al. |
| 2017/0318524 | A1 | 11/2017 | Goto |
| 2017/0374567 | A1 | 12/2017 | Takahashi et al. |
| 2018/0109999 | A1 | 4/2018 | Finnegan |
| 2018/0268674 | A1* | 9/2018 | Siminoff ................ H04N 7/186 |
| 2019/0045407 | A1 | 2/2019 | Logan et al. |
| 2019/0174383 | A1 | 6/2019 | Zhang et al. |
| 2019/0239042 | A1 | 8/2019 | Jahr |
| 2019/0259260 | A1 | 8/2019 | Amini et al. |
| 2019/0261243 | A1 | 8/2019 | Amini et al. |
| 2020/0145890 | A1 | 5/2020 | Ma et al. |
| 2020/0186227 | A1 | 6/2020 | Reider et al. |

FOREIGN PATENT DOCUMENTS

| | | |
|---|---|---|
| CN | 101547342 A | 9/2009 |
| CN | 102523435 A | 6/2012 |
| CN | 102547247 A | 7/2012 |
| CN | 102811370 A | 12/2012 |
| CN | 103369318 A | 10/2013 |
| CN | 103582168 A | 2/2014 |
| CN | 103945438 A | 7/2014 |
| CN | 104919788 A | 9/2015 |
| CN | 205028060 U | 2/2016 |
| CN | 105636078 A | 6/2016 |
| CN | 105792295 A | 7/2016 |
| CN | 105898471 A | 8/2016 |
| CN | 110177071 A | 8/2019 |
| CN | 110177398 A | 8/2019 |
| CN | 110191309 A | 8/2019 |

OTHER PUBLICATIONS

Yang, Chaofan, et al., "Enhancing Industrial Video Surveillance over Wireless Mesh", 2016 25th International Conference on Computer Communication and Networks, 44 pages.

* cited by examiner

SECURITY SYSTEMS IMPLEMENTING COMMUNICATION WITH REMOTE USER DEVICES

CLAIM FOR PRIORITY

This application is a continuation application of U.S. patent application Ser. No. 17/316,120 entitled "Camera Communication Channel Selection," and filed on May 10, 2021, which is a continuation application of U.S. patent application Ser. No. 16/032,235, entitled "Camera Communication Channel Selection," and filed on Jul. 11, 2018, which claims priority to U.S. Provisional Patent Application No. 62/633,017, entitled "Optimization and Testing of Wireless Devices," and filed on Feb. 20, 2018, of which all are incorporated herein by reference in their entirety.

TECHNICAL FIELD

The disclosure relates to cameras, and in particular adjusting camera operation to use different communication channels.

BACKGROUND

Cameras for home or business security uses can generate video data depicting activity occurring within a field of vision of an image sensor of the camera. Often, the video data is transmitted wirelessly to a base station over a communication channel, for example, one implemented using one of the Institute of Electrical and Electronics Engineers (IEEE) 802.11 wireless local area network (LAN) standards.

Many cameras include the capabilities to use different types of communication channels. However, the characteristics of the communication channels can change over time, resulting in a degradation of the ability of the camera to provide the video data to the base station using a selected communication channel. For example, if the camera is using a communication channel that is being used by too many devices, then the throughput of the communication channel might not be ideal for the transfer of the video data to the base station. This can degrade the quality of the video data and degrade the user experience.

SUMMARY

Some of the subject matter described herein includes a method comprising: determining, by a processor, characteristics of a first communication channel and characteristics of a second communication channel usable by a first camera; determining, by the processor, the second communication channel provides better video data transfer capabilities from the first camera than the first communication channel based on a comparison of the characteristics of the first communication channel and the characteristics of the second communication channel; and adjusting, by the processor, operation of the first camera to switch from using the first communication channel to the second communication channel to provide a first video data depicting activity occurring within a field of vision of the first camera, the adjusting based on the comparison of the characteristics of the first communication channel and the characteristics of the second communication channel.

In some implementations, the comparison of the characteristics of the first communication channel and the characteristics of the second communication channel includes determining that the second communication channel has a higher bit rate than the first communication channel.

In some implementations, the first communication channel has a first frequency band, and the second communication channel has a second frequency band, the first frequency band and the second frequency band including different frequencies.

In some implementations, the second frequency includes higher frequencies than the first frequency band.

In some implementations, adjusting the operation of the first camera includes adjusting an encoding of the first video data from a first encoding type to a second encoding type, the first encoding type and the second encoding type producing the first video data at different bit rates.

In some implementations, the second encoding type encodes the video at a higher bit rate than the first encoding type.

In some implementations, the method includes determining that a second camera has begun providing a second video data using the first communication channel while the first camera is also providing the first video data using the second communication channel; and adjusting operation of the second camera to use the second communication channel, and adjusting operation of the first camera to use the first communication channel based upon the determination that the second camera has begun providing the second video data.

Some of the subject matter described herein also includes an electronic device, comprising: one or more processors; and memory storing instructions, wherein the processor is configured to execute the instructions such that the processor and memory are configured to: determine characteristics of a first communication channel and characteristics of a second communication channel usable by a first camera; determine the second communication channel provides better video data transfer capabilities from the first camera than the first communication channel based on a comparison of the characteristics of the first communication channel and the characteristics of the second communication channel; and adjust operation of the first camera to switch from using the first communication channel to the second communication channel to provide a first video data depicting activity occurring within a field of vision of the first camera, the adjusting based on the comparison of the characteristics of the first communication channel and the characteristics of the second communication channel.

In some implementations, the comparison of the characteristics of the first communication channel and the characteristics of the second communication channel includes determining that the second communication channel has a higher bit rate than the first communication channel.

In some implementations, the first communication channel has a first frequency band, and the second communication channel has a second frequency band, the first frequency band and the second frequency band including different frequencies.

In some implementations, the second frequency includes higher frequencies than the first frequency band.

In some implementations, adjusting the operation of the first camera includes adjusting an encoding of the first video data from a first encoding type to a second encoding type, the first encoding type and the second encoding type producing the first video data at different bit rates.

In some implementations, the second encoding type encodes the video at a higher bit rate than the first encoding type.

In some implementations, the processor is configured to execute the instructions such that the processor and memory are configured to: determine that a second camera has begun providing a second video data using the first communication channel while the first camera is also providing the first video data using the second communication channel; and adjust operation of the second camera to use the second communication channel, and adjusting operation of the first camera to use the first communication channel based upon the determination that the second camera has begun providing the second video data.

Some of the subject matter described herein also includes a computer program product including one or more non-transitory computer-readable media storing computer program instructions, execution of which by a processing system causes the processing system to perform operations comprising: determine characteristics of a first communication channel and characteristics of a second communication channel usable by a first camera; determine the second communication channel provides better video data transfer capabilities from the first camera than the first communication channel based on a comparison of the characteristics of the first communication channel and the characteristics of the second communication channel; and adjust operation of the first camera to switch from using the first communication channel to the second communication channel to provide a first video data depicting activity occurring within a field of vision of the first camera, the adjusting based on the comparison of the characteristics of the first communication channel and the characteristics of the second communication channel.

In some implementations, the comparison of the characteristics of the first communication channel and the characteristics of the second communication channel includes determining that the second communication channel has a higher bit rate than the first communication channel.

In some implementations, the first communication channel has a first frequency band, and the second communication channel has a second frequency band, the first frequency band and the second frequency band including different frequencies.

In some implementations, the second frequency includes higher frequencies than the first frequency band.

In some implementations, adjusting the operation of the first camera includes adjusting an encoding of the first video data from a first encoding type to a second encoding type, the first encoding type and the second encoding type producing the first video data at different bit rates.

In some implementations, the processor is configured to execute the instructions such that the processor and memory are configured to: determine that a second camera has begun providing a second video data using the first communication channel while the first camera is also providing the first video data using the second communication channel; and adjust operation of the second camera to use the second communication channel, and adjusting operation of the first camera to use the first communication channel based upon the determination that the second camera has begun providing the second video data.

DETAILED DESCRIPTION

This disclosure describes techniques for switching a communication channel used by a camera to provide video data to a base station. In one example, a camera can use one or more of different types of communication channels to wirelessly transmit, or stream, video data to a base station upon detection of motion within a field of view of an image sensor of the camera. The camera can have the capability to transmit the video data using, for example, a communication channel implementing using the Institute of Electrical and Electronics Engineers (IEEE) 802.11 wireless local area network (WLAN) standards in a 2.4 gigahertz (GHz) frequency band, another communication channel implementing the IEEE 802.11 WLAN standards in the 5 GHz frequency band, another communication channel implemented via a cellular communication technology standard such as Long-Term Evolution (LTE), another communication channel implemented via Digital Enhanced Cordless Telecommunications (DECT), another communication channel implemented by a wireless personal area network (PAN) such as Bluetooth, Z-Wave, Zigbee, another communication channel implemented via millimeter wave (mmWave), or other types of wireless communications technologies.

However, the communication channel used by the camera might degrade over time. For example, the communication channel might experience interference that reduces its throughput (and, therefore, reduces the available bit rate for the communication channel). This can result in the camera compressing the video quality of the video data so that it is at a lower bit rate and, therefore, the corresponding video would not look as pleasing (e.g., have less visual detail, resolution, etc.) to a user than if the video had a higher bit rate. Other devices within the environment (e.g., other cameras) might also be using the same communication channel which can also cause the communication channel to be congested and, therefore, a lower bit rate is available for the devices. This can also result in the quality of the video data provided by the camera to the base station to be reduced such that the video data can be provided to the base station within some threshold latency.

As described herein, the base station can instruct the camera to change the communication channel it is using to provide better video data transfer capabilities. For example, the base station can receive video data from the camera using the IEEE 802.11 standard in the 2.4 GHz band. The base station can then determine that the IEEE 802.11 standard in the 5 GHz band provides a higher quality communication channel for the video data transfer, for example, by comparing the available bit rate of the communication channels. If the 5 GHz band provides a higher bit rate such that the quality (e.g., bit rate of the encoding) of the video data can be increased to provide the user with a better video to watch, then the base station can instruct the camera to switch to the 5 GHz band from the 2.4 GHz band and provide the video data on the 5 GHz band. Additionally, the base station can instruct the camera to adjust how it is encoding the video, for example, by increasing the encoding to a higher bit rate or switching to a different video compression standard to take advantage of the better communication channel.

Figure 1:
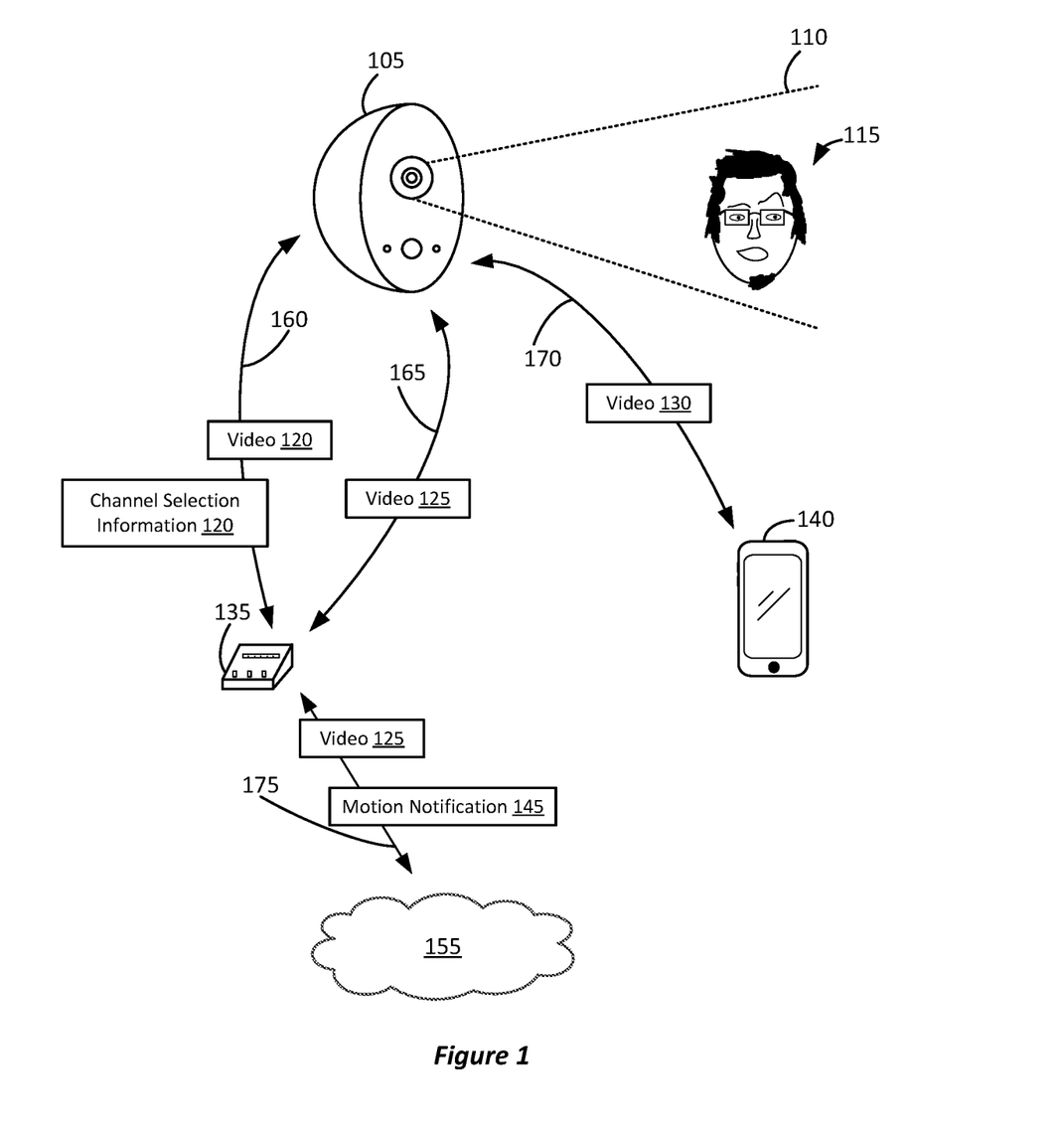
FIG. 1 illustrates an example of adjusting a communication channel used by a camera.

In more detail, FIG. 1 illustrates an example of adjusting a communication channel used by a camera. In FIG. 1, camera 105 includes an infrared (IR) sensor that can be used to detect motion by determining the motion of heat in the infrared portion of the electromagnetic spectrum. Upon detection of motion, camera 105 can then use an image sensor (e.g., complementary metal-oxide-semiconductor (CMOS) image sensor) to generate video data depicting the activity creating the detected motion within its field of vision 110 and within the visible light portion of the electromagnetic spectrum. In FIG. 1, this can be a video visually depicting intruder 115 entering field of vision 110.

In FIG. 1, camera 105 can then provide video 120 to base station 135 using communication channel 160. Video 120 can be provided in a variety of ways including streaming fragments of video data as the video fragments are generated by camera 105 or uploading an entire video file after the last fragment has been generated rather than streaming fragments or groups of fragments as they are generated. Base station 135 can be an electronic device in wireless communication with camera 105 and cloud server 155 to receive video data from camera 105 and provide that video or a notification of recorded video to cloud server 155 such that a homeowner (e.g., the owner of the home in which camera 105 is installed upon or within) can be alerted to intruder 115. Though many of the examples described herein relate to wireless communications, the devices described herein can also be physically wired to each to provide the transfer of the various types of data being generated.

However, the characteristics of communication channel 160 might change over time. For example, network congestion can increase as other devices use the same communication channel to communicate with base station 135 or even other devices within the environment. An increase in network congestion can result in a reduced quality of service because the communication channel might need to transfer more data than it can handle. Other issues, such as interference, can also reduce the throughput of communication channel 160, resulting in a reduced bit rate for the transfer of video 120. If the bit rate available for transfer of video 120 using communication channel 160 is too low, then the bit rate of the encoding of the video might need to be reduced such that video 120 can be provided to base station 135 within a reasonable time.

In FIG. 1, base station 135 and camera 105 can include multiple radios and/or antennas to communicate in other communication channels. By having the capability to use multiple communication channels, another communication channel can be used if the currently used communication channel does not offer the right characteristics. For example, camera 105 can also communicate with base station 135 via communication channel 165. Communication channels 160 and 165 can be implemented via any number of technologies including IEEE 802.11 WLAN standards in the 2.4 GHz frequency band, the IEEE 802.11 WLAN standard in the 5 GHz frequency band, cellular communication technology such as Long-Term Evolution (LTE), Digital Enhanced Cordless Telecommunications (DECT), or a wireless personal area network (PAN) such as Bluetooth, Z-Wave, Zigbee, etc. For example, communication channel 160 can be implemented via IEEE 802.11 WLAN in the 2.4 GHz frequency band, and communication channel 165 can be implemented via IEEE 802.11 WLAN in the 5 GHz frequency band. The IEEE 802.11 WLAN in the 5 GHz frequency band includes higher frequencies than the IEEE 802.11 WLAN in the 2.4 GHz frequency band. For example, the frequencies for the 2.4 GHz band might range from 2.4 GHz to 2.5 GHz. The frequencies for the 5 GHz band might range from 5.15 GHz to 5.30 GHz. Thus, the 5 GHz band includes higher frequencies than the 2.4 GHz band, resulting in the 5 GHz band potentially having a higher bit rate. Though the 2.4 GHz band might operate at a lower frequency, the 2.4 GHz might have better range and penetration through solid objects such as walls. Therefore, based on the placement of the camera 105 and base station 135, different communication channels might be better to use. Additionally, the communication channels might be used differently at different times during the day, resulting in different characteristics for the communication channels throughout the day. For example, in the evenings, the 5 GHz communication channel might be used by more devices as more people are home using devices.

Base station 135 can determine that camera 105 should switch from using communication channel 160 to using communication channel 165 if communication channel 165 provides better capabilities for wirelessly transferring video. For example, base station 135 can determine that communication channel 165 currently has a higher bit rate than communication channel 160 by comparing the bit rates that the communication channels are operating at. Base station 135 can then generate channel selection information 120 providing instructions or information to camera 105 on communication channel 160 such that camera 105 can then switch to providing video 125 upon communication channel 165 instead of communication channel 160. Video 125 can include video data depicting activities within field of vision 110 occurring after video 120 was provided to base station 135. That is, video 125 can be the second portion of a video occurring after video 120 is provided to base station 135 and camera 105 switches over to using communication channel 165.

Base station 135 can provide video 125 (and video 120) to cloud server 155 such that the homeowner can view the video depicting intruder 115 later. Additionally, motion notification 145 can be generated upon base station 135 receiving video 120 so that the homeowner can receive an alert of the notification. For example, upon receiving motion notification 145, cloud server 145 can generate a text message that is transmitted to the homeowner's smartphone, send an email to the homeowner's email address, or cause a notification via an app to show on the homeowner's smartphone.

Additionally, base station 135 can determine whether internet connection 175 (i.e., a communication channel used by base station 135 to communicate with cloud server 155) is functioning or degraded. For example, if internet connection 175 is down (i.e., data cannot be exchanged between base station 135 and cloud server 155) or if the throughput of internet connection 175 is low (e.g., having a lower than expected bit rate for sending video 125 to cloud server 155) such that video 125 or video 120 would be provided to cloud server 155 too slowly, then base station 135 can determine this (e.g., by attempting to send a packet of data to cloud server 155 and checking to see if an acknowledgement packet is received back) and then generate channel selection information so that camera 105 can select a different communication channel that does not rely on base station 135 to provide video data to cloud server 155. For example, communication channel 170 can be implemented via LTE such that video 130 can be provided via a cellular connection to smartphone 140. Thus, base station 135 can determine a variety of characteristics of the communication channels and adjust which communication channel that camera 105 uses to provide video data depicting intruder 115 within field of vision 110. In addition to adjusting the communication channels, base station 135 can also instruct camera 105 to change how camera 105 is generating the video data, for example, by changing the type of compression used for the encoding of the video or the bit rate of the encoding.

By adjusting the communication channel used by camera 105, a better user experience can be provided. For example, the videos can be provided faster to base station 135, smartphone 140, or cloud server 155. Additionally, the quality of the videos can be improved, for example, by recording the video data with a compression standard and/or bit rate based on the communication channel being used. This can also provide a better user experience.

Figure 2:
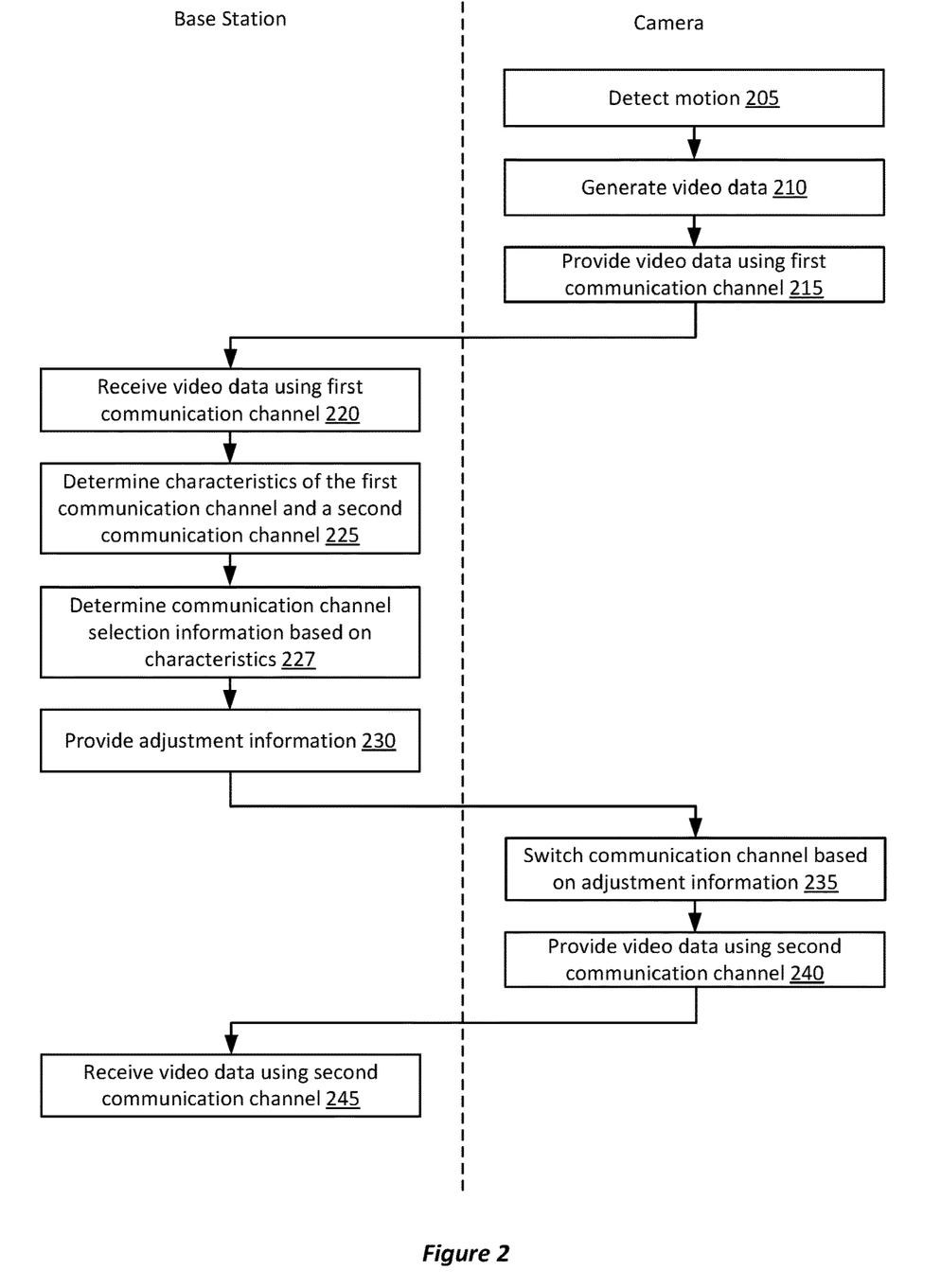
FIG. 2 illustrates an example of a block diagram for adjusting operation of a camera to use a different communication channel.

FIG. 2 illustrates an example of a block diagram for adjusting operation of a camera to use a different communication channel. In FIG. 2, a camera can detection motion (205) and generate video data (210) upon detection of that motion. For example, in FIG. 1, camera 105 can detect the movement of intruder 115 within field of vision 110 and then generate video 120. Video data can then be provided to a base station using a first communication channel (215). For example, in FIG. 1, video 120 can be wirelessly transmitted to base station 135 using communication channel 160.

The base station can receive the video data using the first communication channel (220). The base station can also determine characteristics of the first communication channel and a second communication channel (225). For example, in FIG. 1, base station 135 can determine characteristics of communication channel 160 (i.e., the communication channel used by camera 105 to provide video 120 to base station 135) and communication channel 165, which is another communication channel available for use for wireless communication between camera 105 and base station 135. Base station 135 can determine a variety of characteristics of communication channels 160 and 165, for example, interference on the communication channels, the throughput of the communication channels, the available bit rate of the communication channels, how many devices are using the communication channels, etc.

The base station can then determine communication channel selection information based on the characteristics (227). For example, in FIG. 1, base station 135 can analyze the characteristics of communication channels 160 and 165, for example, by comparing the characteristics to determine the differences between the channels. The communication channel with the better characteristics for providing the video data from camera 105 to base station 135 can then be selected for use. For example, communication channel 165 can be selected for camera 105 to use if communication channel 165 has characteristics that would provide a better mechanism to provide video data from camera 105 to base station 135 than communication channel 160, for example, higher throughput, higher available bit rate for camera 105, less interference, etc. The base station can then provide adjustment information to the camera (230). The adjustment information can include data or instructions for the camera to switch from using communication channel 160 to providing the video data using communication channel 165.

The camera can then switch from using the first communication channel to the second communication channel based on the adjustment information (235). This can result in the camera providing the video data using the second communication channel (240). For example, in FIG. 1, camera 105 can switch from using communication channel 160 to using communication channel 165 and providing video 125 on communication channel 165. The base station can then receive the video data using the second communication channel (245).

Often, a home or business might have multiple cameras set up. These multiple cameras might be providing video data to base station 135 at the same or similar times. If the multiple cameras use the same communication channel, then this might degrade the performance or quality of service, as described above. In some implementations, base station 135 can determine whether multiple cameras are providing video data and adjust how those multiple cameras are providing video data to provide better performance or service.

In some implementations, the communication channel selected (or switched to) can be based on coexistence issues with other communication protocols or standards. For example, if LTE band 40 is being used at 2300 MHz to 2400 MHz for Internet access, then the channel selected for camera 105 can be selected such that it is farther away from the LTE band 40 frequency range in the frequency domain. Thus, in this example, if the communication channel is being switched from the IEEE 802.11 5 GHz standard to the IEEE 802.11 2.4 GHz standard, then a channel within the 2.4 GHz that does not overlap within the 2300 MHz to 2400 MHz frequency band can be selected.

Additionally, characteristics regarding the performance of the camera 105, base station 135, or the system including both camera 105 and base station 135 can be considered. For example, some channels might result in camera 105 to use more power to transmit data including video, resulting in a higher transmit power and, therefore, better transmission capabilities for providing video to base station 135. In this situation, those communication channels that use higher power can be selected. For example, in North American, channels 1 and 11 in the IEEE 802.11 standards are designated for low power communications and, therefore, those channels can be avoided for channels that can be used with high power.

In some implementations, noise or interference in some communication channels can be experienced due to harmonics (e.g., from processors, memory, and other hardware within camera 105). The noise and interference can change as the devices are being used. Thus, the amount of noise or interference can be considered and the selection of the communication channel can be based on the amount of noise or interference.

Additionally, some cameras can be designated as having a higher priority than another camera. For example, a camera providing a field of view of the pathway to a front door of a house might be more important than a camera that has a field of view of a driveway or backyard rather than the front door of the house. In this case, the camera with that has a higher priority can have a communication channel preference being weighted higher than the other camera. The priorities can be designated by a user (e.g., via a smartphone app, website, etc.) or the priorities can be designated by base station 135. For example, base station 135 can determine that one camera has a field of view of the front of a door and that another camera does not have a field of view of the front of the door by analyzing the image content generated by the videos.

Figure 3:
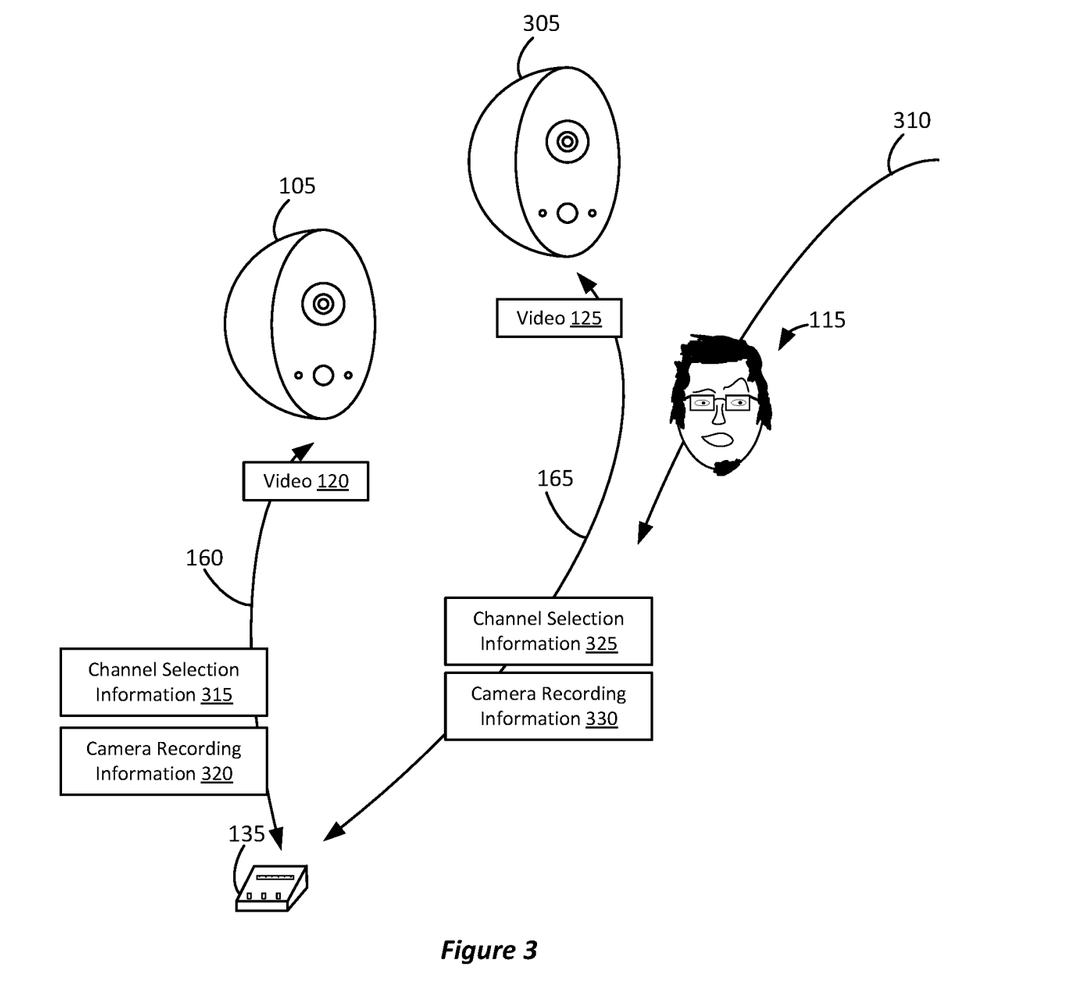
FIG. 3 illustrates an example of adjusting communication channels used by multiple cameras.

FIG. 3 illustrates an example of adjusting communication channels used by multiple cameras. In FIG. 3, base station 135 can adjust how both camera 105 and camera 305 provide video data to base station 135 via communication channels. For example, in FIG. 3, camera 105 can be using communication channel 160 to communicate with base station 135 and camera 305 can be using communication channel 165 to communicate with base station 135. Cameras 105 and 305 can be placed within different locations and, therefore, have different fields of view. Moreover, even if the cameras use the same communication channel, the performance might be different due to how the different physical locations affect the communication channel.

In FIG. 3, as intruder 115 moves along path 310, intruder 115 would first appear within the field of vision of camera 305. This results in video 125 being generated and provided to base station 135 via communication channel 165, which might be implemented via the IEEE 802.11 standards in the 5 GHz band. Later, as intruder 115 continues along path 310, eventually the user might also appear within the field of vision of camera 105. This would result in video 120 being generated by camera 105 and provided to base station 135. Moreover, the field of visions of both cameras 105 and 305 might overlap, resulting in both cameras 105 and 305 generating and wirelessly transmitting videos 120 and 125, respectively, at the same time.

Base station 135 can adjust which communication channel is being used by the cameras as videos are provided. For example, if video 125 is first provided by camera 305 but intruder 115 is not yet within the field of vision of camera 105, then only communication channel 165 can be used to provide video data providing a visual depiction of intruder 115. Communication channel 165 might be selected if it is the best communication channel to provide video 125 to base station 165, for example, it has a high bit rate such as a 5 GHz band. Eventually, when intruder 115 is within the field of vision of camera 105, then video 120 can be generated by camera 105 even while intruder 115 is within the field of vision of camera 305 and video 125 is still being provided to base station 135. In some implementations, communication channel 165 can also be used by camera 105 to provide video 120 to base station 135. That is, both cameras 105 and 305 can use the same communication channel to provide video data. However, in some implementations, the cameras might provide a better experience if different communication channels are used to provide video data to base station 135. For example, camera 105 might initially use communication channel 160, which can be a 2.4 GHz band. This can result in a situation where camera 305 is using communication channel 165 that allows a higher bit rate and, therefore, a higher bit rate encoding can be performed of video 125 to provide a higher quality video for the user to watch. By contrast, camera 105 can be using communication channel 160 that allows for a lower bit rate than communication channel 165 and, therefore, a lower bit rate encoding can be performed of video 120 to provide a lower quality video than video 125.

As intruder 115 moves along path 310, video 125 provided by camera 305 might initially provide a better depiction of this movement and, therefore, can benefit from being able to provide a higher quality video. However, as intruder 115 continues along path 310, camera 105 can then provide a video and, eventually, video 120 produced by camera 105 might provide a better view of intruder 115 for a user. In this situation, base station 135 can adjust the communication channels used by the cameras such that the camera that is providing the better view of intruder 115 can be using communication channel 165 (i.e., the communication channel that allows for a higher bit rate for transferring video data in the example). This can result in an improved user experience because the relevant portions of the videos can be higher quality than the less relevant portions of the videos. Moreover, this can provide a more efficient use of the bandwidth of the communication channels.

For example, in FIG. 3, base station 135 can provide channel selection information 315 on communication channel 160 to camera 105 such that it can adjust its operating parameters to switch communication with base station 135 using communication channel 165. Likewise, base station 135 can provide channel selection information 325 to camera 305 such that camera 105 can adjust its operating parameters to switch to using communication channel 160 to provide video 125. This results in the communication channels used by cameras 105 and 305 to switch.

Base station 135 can switch the use of communication channel 165 from camera 305 to camera 105 based on a variety of characteristics. For example, how long a camera is generating video data can be used to switch the use of communication channel 165. For example, if camera 305 is recording video 125 for three minutes and then camera 105 beings recording video 120, the use of communication channel 165 can switch from camera 305 to camera 105 after three minutes.

In some scenarios, cameras 105 and 305 can be battery-powered and the use of a communication channel might be more computationally intensive, resulting in the battery draining faster than if another communication channel is being used. For example, using LTE might be more intensive than using one of the IEEE 802.11 WLAN standards. In some implementations, base station 135 can adjust the operations of cameras 105 and 305 such that the camera with lower battery resources (i.e., the camera that might have a lower time to remain operational and record videos using its battery) can use a communication channel that would use less computationally intensive resources to preserve or extend the battery life. For example, in FIG. 1, base station 135 can determine that camera 105 has a lower battery life or less battery capacity or capability to power camera 105 remaining than camera 305. This can result in base station adjusting camera 105 to use communication channel 165 rather than communication channel 160, and camera 105 to use communication channel 160.

Base station 135 can also adjust the communication channel used based on how close the movement being depicted in the video is to the center of the field of vision of the cameras. For example, if camera 305 first begins recording, camera 305 can be selected by base station 135 to use communication channel 165 (e.g., a 5 GHz band) and camera 105 can use communication channel 160 (e.g., a 2.4 GHz band). Eventually, both cameras 105 and 305 can be recording at the same time as intruder 115 travels along path 310 and enters the field of visions of both cameras 105 and 305. Base station 135 can analyze videos 120 and 125 as they are received from cameras 105 and 305, respectively, and if the movement of intruder 115 is eventually closer to the middle of the field of vision of camera 105 than the middle of the field of vision of camera 305, then base station 135 can generate and provide channel selection information 315 and 325 to be provided to camera 105 and 305, respectively, to switch the communication channels being used. Thus, the videos that are generated by the cameras can have higher quality portions of the playback that a user would want to watch to see the activity that occurred (i.e., intruder 115 along path 310).

As depicted in FIG. 3, camera recording information 320 and 330 can also be provided to camera 105 and 305, respectively. Camera recording information 320 and 330 can include information used by the cameras to adjust operation including how the videos are encoded. For example, if base station 135 provides channel selection information 315 to camera 105 to switch to using communication channel 165, base station 135 can also provide camera recording information 320 including the bit rate for encoding video 120 when switching over to communication channel 165. This can allow for base station 135 to determine the bit rate that is available to camera 105 to wirelessly transfer video 120 upon communication channel 165 and then have camera 105 encode video 120 at a bit rate in accordance with the available bit rate of communication channel 165. This can allow for video 120 to be provided to base station 135 in a timely manner and without quality issues such as dropped packets of video data. Base station 135 can also provide camera recording information 320 providing information regarding an encoding type to use. For example, base station 135 can determine that the throughput or available bit rate of communication channel 165 can allow for camera 105 to encode videos using a different encoding standard, such as the High Efficiency Video Coding (HEVC) standard, or H.265, rather than an older standard such as H.264.

Figure 4:
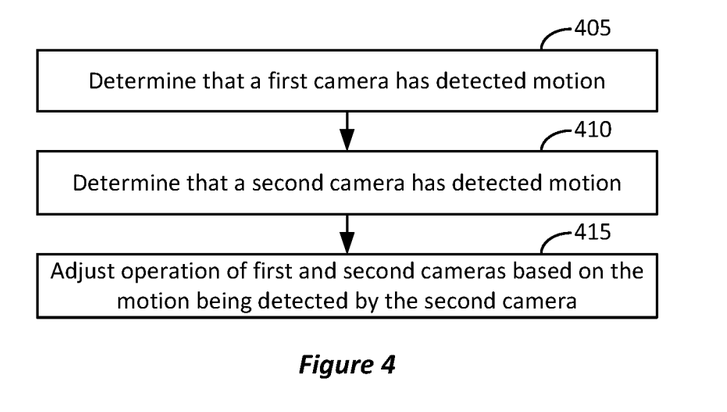
FIG. 4 illustrates an example of a block diagram for adjusting communication channels used by multiple cameras.

FIG. 4 illustrates an example of a block diagram for adjusting communication channels used by multiple cameras. In FIG. 4, at block 405, a base station can determine that a first camera has detected motion. For example, in FIG. 3, camera 305 can detect motion and provide video 125 depicting that motion to base station 135. Thus, when base station 135 receives video 125, this is an indication that motion has been detected within the field of vison of the image sensor of camera 305. Next, at block 410, it can be determined that a second camera has detected motion. For example, in FIG. 3, camera 105 can detect motion and provide video 120 depicting an object causing the motion to base station 135. Thus, when base station 135 receives video 120, this is also an indication that motion has been detected within the field of vision of the image sensor of camera 305. Next, at block 415, the base station can adjust the operation of the first and second cameras based on the motion being detected by the second camera. For example, in FIG. 3, the communication channels used by cameras 105 and 305 can be switched, as described above.

Figure 5:
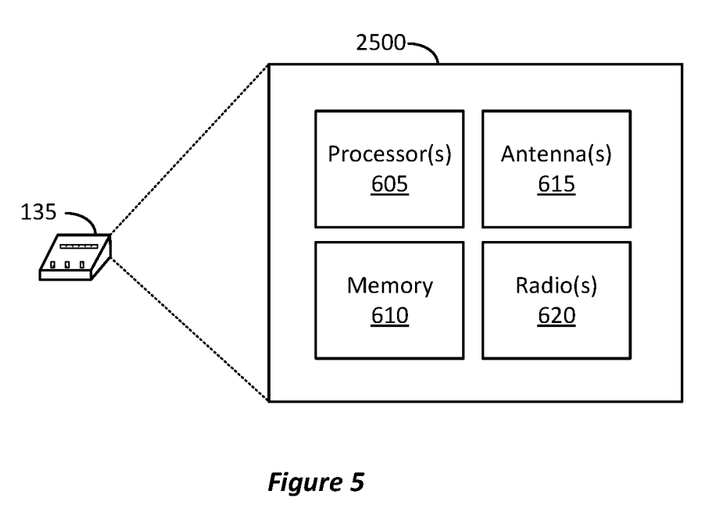
FIG. 5 illustrates an example of a simplified block diagram of an electronic device which may be used with some implementations.

FIG. 5 illustrates an example of a simplified block diagram of an electronic device which may be used with some implementations. The electronic device of FIG. 5 can implement any of the functionalities and features discussed above, including base station 135. However, the components can also be used to implement camera 105 and camera 305.

For example, FIG. 5 portrays a high-level block diagram illustrating a processing device 2500 implementing base station 135 in which at least some operations described herein can be implemented. In some implementations, the block diagram can also implement the other devices described herein, such as camera 105. The processing system can be a system that can run any of the methods/algorithms/techniques described above.

In the illustrated embodiment, the processing device 2500 includes one or more processors 605, memory 610, antenna 615, and one or more radios 620. Processors 605 may be or include, for example, one or more general-purpose programmable microprocessors or microprocessor cores, microcontrollers, application specific integrated circuits (ASICs), programmable gate arrays, or the like, or a combination of such devices. The processor(s) 605 control the overall operation of the processing device 2500. Memory 610 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 610 may store data and instructions that configure the processor(s) 605 to execute operations in accordance with the techniques described above. Processing device 2500 can also include communication devices that may be or include, for example, an Ethernet adapter, cable modem, Wi-Fi adapter, cellular transceiver, Bluetooth transceiver, or the like, or a combination thereof. Depending on the specific nature and purpose of the processing device 2500, it can also include I/O devices that can include devices such as a display (which may be a touch screen display), audio speaker, keyboard, mouse or other pointing device, microphone, camera, etc. Processing device 2500 can also include radios 620, for example, a different radio for each band that communication links can be established within. Processing device 2500 can also include one or more antennas 615 for aiding the establishing of the communication links. For example, radio 620 can generate a signal that is transmitted via antenna 615.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 2500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A computer-implemented method comprising:
wirelessly receiving, by a base station, video data from a camera, the video data capturing motion of an individual within a field of vision of the camera,
  wherein the base station is located at a first location and the camera is located at a second location different from the first location, and
  wherein the video data is sent from the camera to the base station over a first frequency band of a first communication channel;
generating, by the base station, a notification of the motion captured by the video data, the notification indicating presence of the individual;
responsive to determining that the video data is uncompressed, continuing, by the base station, to receive the video data over the first frequency band;
determining, by the base station, that the video data is being compressed by the camera;
responsive to determining that the video data is being compressed, instructing, by the base station, the camera to use a second frequency band of a second communication channel,
  wherein the first frequency band and the second frequency band have different frequencies;
sending, by the base station, the video data to a cloud server for viewing by a user using a user device; and
sending, by the base station, an alert of the notification of the motion to the user device for the user to view the video data on the cloud server.

2. The method of claim 1, further comprising:
causing, by the base station, operation of the camera to switch from the second communication channel to a third communication channel to provide the video data directly from the camera to the cloud server based on characteristics of the first communication channel and characteristics of the second communication channel.

3. The method of claim 1, wherein causing the operation of the camera to switch from the first communication channel to the second communication channel is responsive to determining, by the base station, that the second communication channel has a higher bit rate than the first communication channel.

4. The method of claim 1, wherein causing the operation of the camera to switch from the first communication channel to the second communication channel is responsive to determining, by the base station, that the second frequency band of the second communication channel has higher frequencies than the first frequency band of the first communication channel.

5. The method of claim 1, wherein causing the operation of the camera to switch from the first communication channel to the second communication channel comprises causing, by the base station, the camera to adjust an encoding of the video data from a first encoding type to a second encoding type, the first encoding type and the second encoding type producing the video data at different bit rates.

6. The method of claim 5, wherein the second encoding type encodes the video at a higher bit rate than the first encoding type.

7. The method of claim 1, further comprising:
causing, by the base station, operation of the camera to switch from the first communication channel to a third communication channel to provide the video data directly from the camera to the user device based on characteristics of the first communication channel and characteristics of the second communication channel.

8. An electronic device, comprising:
one or more processors; and
memory storing instructions, wherein the processor is configured to execute the instructions such that the processor and memory are configured to:
  cause a base station to wirelessly receive video data from a camera, the video data capturing motion of an individual within a field of vision of the camera,
    wherein the base station is located at a first location and the camera is located at a second location different from the first location, and wherein the video data is sent from the camera to the base station over a first frequency band of a first communication channel;

generate a notification of the motion captured by the video data, the notification indicating presence of the individual;

responsive to determining that the video data is uncompressed, cause the base station to continue to receive the video data over the first communication channel;

determine that the video data is being compressed by the camera;

responsive to determining that the first video data is being compressed, instruct the camera to use a second frequency band of a second communication channel, wherein the first frequency band and the second frequency band have different frequencies;

send the video data to a cloud server for viewing by a user using a user device; and send an alert of the notification of the motion to the user device for the user to view the video data on the cloud server.

9. The electronic device of claim 8, wherein the instructions when executed by the processor further configure the processor and memory to:

cause operation of the camera to switch from the second communication channel to a third communication channel to provide the video data directly from the camera to the cloud server based on characteristics of the first communication channel and characteristics of the second communication channel.

10. The electronic device of claim 8, wherein the instructions cause the operation of the camera to switch from the first communication channel to the second communication channel responsive to a determination that the second communication channel has a higher bit rate than the first communication channel.

11. The electronic device of claim 8, wherein the instructions cause the operation of the camera to switch from the first communication channel to the second communication channel responsive to a determination that the second frequency band of the second communication channel has higher frequencies than the first frequency band of the first communication channel.

12. The electronic device of claim 8, wherein the instructions cause the operation of the camera to switch from the first communication channel to the second communication channel by configuring the processor and memory to adjust an encoding of the video data from a first encoding type to a second encoding type, the first encoding type and the second encoding type producing the video data at different bit rates.

13. The electronic device of claim 12, wherein the second encoding type encodes the video at a higher bit rate than the first encoding type.

14. The electronic device of claim 8, wherein the instructions when executed by the processor further configure the processor and memory to:

cause operation of the camera to switch from the first communication channel to a third communication channel to provide the video data directly from the camera to the user device based on characteristics of the first communication channel and characteristics of the second communication channel.

15. A computer-implemented method comprising:

wirelessly sending, by a camera, video data to a base station, the video data capturing motion of an individual within a field of vision of the camera, wherein the base station is located at a first location and the camera is located at a second location different from the first location, and wherein the video data is sent from the camera to the base station over a first frequency band of a first communication channel;

generating, by the camera, a notification of the motion captured by the video data, the notification indicating presence of the individual;

responsive to determining that the video data is uncompressed, continuing, by the camera, to send the video data over the first frequency band;

determining that the video data is being compressed by the camera;

responsive to determining that the video data is being compressed by the camera, using, by the camera, a second frequency band of a second communication channel, wherein the first frequency band and the second frequency band have different frequencies;

causing, by the camera, the base station to send the video data to a cloud server for viewing by a user using a user device; and sending, by the camera, an alert of the notification of the motion to the user device for the user to view the video data on the cloud server.

16. The method of claim 15, further comprising:

switching, by the camera, from the second communication channel to a third communication channel to provide the video data directly from the camera to the cloud server based on characteristics of the first communication channel and characteristics of the second communication channel.

17. The method of claim 15, wherein switching from the first communication channel to the second communication channel is responsive to determining, by the camera, that the second communication channel has a higher bit rate than the first communication channel.

18. The method of claim 15, wherein switching from the first communication channel to the second communication channel is responsive to determining, by the camera, that the second frequency band of the second communication channel has higher frequencies than the first frequency band of the first communication channel.

19. The method of claim 15, wherein switching from the first communication channel to the second communication channel comprises adjusting, by the camera, an encoding of the video data from a first encoding type to a second encoding type, the first encoding type and the second encoding type producing the video data at different bit rates.

20. The method of claim 15, further comprising:

switching, by the camera, from the second communication channel to a third communication channel to provide the video data directly from the camera to the user device based on characteristics of the first communication channel and characteristics of the second communication channel.

* * * * *